Aug. 3, 1965 J. E. COOGAN 3,199,040

CRYSTAL FREQUENCY DISCRIMINATOR

Filed Sept. 6, 1962

JAMES E. COOGAN
INVENTOR.

BY [signature]
[signature]
ATTORNEYS

United States Patent Office 3,199,040
Patented Aug. 3, 1965

3,199,040
CRYSTAL FREQUENCY DISCRIMINATOR

James E. Coogan, Palo Alto, Calif., assignor, by mesne assignments, to the United States of America as represented by the Secretary of the Navy Filed Sept. 6, 1962, Ser. No. 221,925
1 Claim. (Cl. 329—117)

The present invention relates to a crystal frequency discriminator and more particularly to an improved crystal frequency discriminator in which the center frequency is mean between the resonance frequency of crystals.

An object of the present invention is to provide an improved frequency discriminator.

Another object of the present invention is to provide a crystal discriminator which will produce a positive or negative voltage when an excitation signal deviates from the center frequency of the discriminator.

A further object of the invention is to provide a crystal discriminator which can maintain a center frequency that is as precise as the crystals employed.

Other objects and many of the attendant advantages of this invention will become readily appreciated as the same becomes better understood by reference to the following detailed description when considered in connection with the accompanying drawings wherein.

Figure 1:
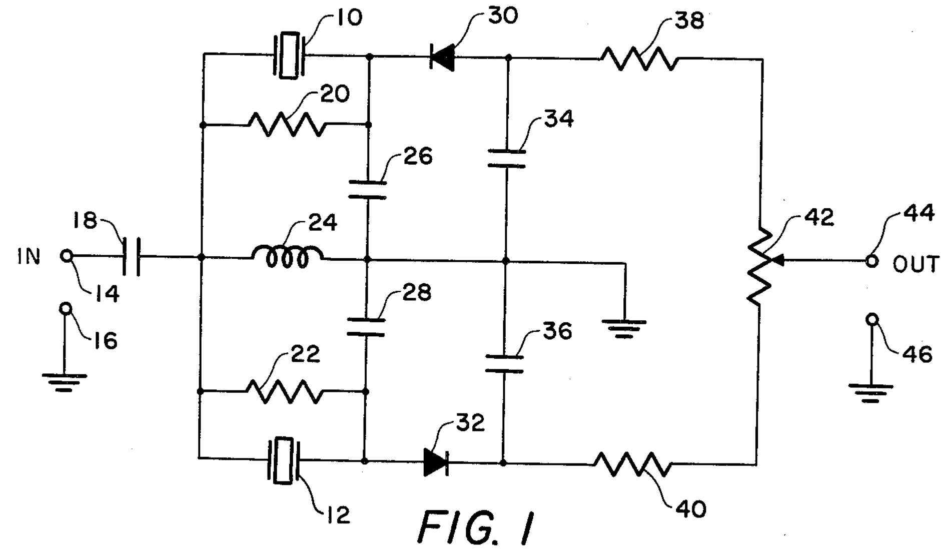
FIG. 1 is a circuit diagram of a preferred embodiment of the invention.

Referring now to the accompanying drawing, there is shown, in the preferred embodiment of the invention, crystal resonators 10 and 12 coupled to input terminals 14 and 16 through isolation capacitor 18. Load resistors 20 and 22 are connected across crystals 10 and 12 respectively. An inductor 24 which provides radio frequency isolation but permits a D.C. return is connected between the common connection of capacitors 26 and 28 and the common connection of crystals 10 and 12. Diodes 30 and 32 are connected respectively to crystals 10 and 12 for rectifying their outputs. Diodes 30 and 32 are coupled to storage capacitors 34 and 36 respectively and through isolation resistors 38 and 40 to balancing potentiometer 42. The output of the discriminator is taken from the movable tap of potentiometer 42 and appears across output terminals 44 and 46.

In operation, when an A.C. signal is applied to terminal 14 and is at the frequency of resonator 10, resonance will occur. The R.F. path is through capacitor 18, resonator 10, resistor 20 and capacitor 26. A portion of the R.F. energy is rectified through diode 30 and stored across capacitor 34. In the example described, the voltage across capacitor 34 is negative. If the frequency of the signal applied to terminal 14 is at the frequency of resonator 12, then the R.F. path is through capacitor 18, resonator 12, resistor 22 and capacitor 28. A portion of the R.F. energy is rectified through diode 32 and stored across capacitor 36. The voltage developed across capacitor 36 in this case is positive. Potentiometer 42 is provided to balance any inequalities between capacitor 34, resistor 38 and capacitor 36, resistor 40. As can be seen, when the frequency of a signal applied to terminal 14 is intermediate the resonant frequencies of crystals 10 and 12 the output at terminal 44 is zero. If the resonant frequencies of the crystals 10 and 12 are close, a typical discriminator curve is obtained. If the resonant frequencies of the crystals 10 and 12 are widely separated, a "plateau" may be obtained between the two extremities.

Figure 2:
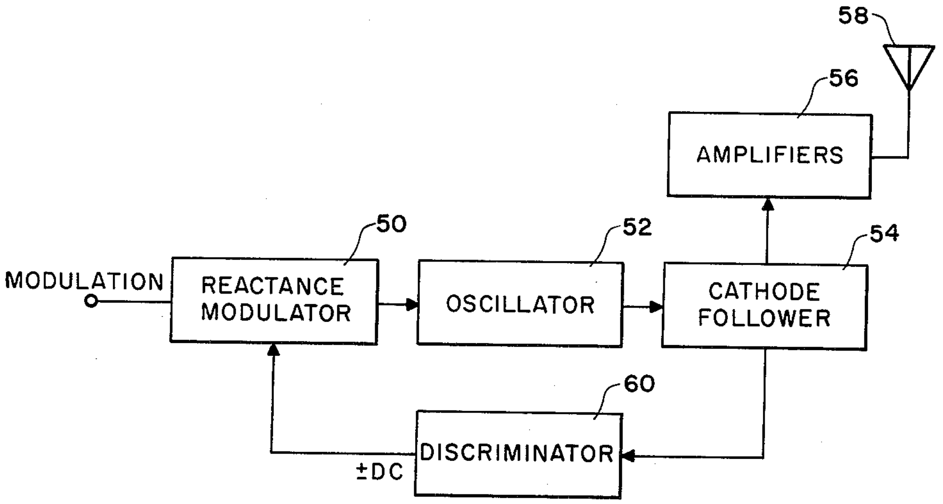
FIG. 2 is a block diagram of an FM transmitter utilizing the invention.

FIG. 2 shows that portion of an FM transmitter to illustrate how the discriminator may be used as the absolute mean frequency control. The portion shown includes a reactance modulator 50, oscillator 52, cathode follower 54, amplifier 56, and antenna 58. Discriminator 60 is coupled between cathode follower 54 and modulator 50. A portion of the output of cathode follower 58 is fed through discriminator 60 to provide a corrective voltage for controlling modulator 50.

Obviously many modifications and variations of the present invention are possible in the light of the above teachings. It is therefore to be understood that within the scope of the appended claim the invention may be practiced otherwise than as specifically described.

What is claimed is:

A frequency discriminator comprising:

(a) an input terminal adapted to have an A.C. signal voltage applied thereto, (b) a first crystal resonant at a first predetermined frequency mounted between first and second electrodes, (c) a second crystal resonant at a second predetermined frequency mounted between third and fourth electrodes, (d) coupling capacitor means coupling said first and third electrodes to said input terminal, (e) first load resistor means connected across said first and second electrodes, (f) second load resistor means connected across said third and fourth electrodes, (g) first and second capacitors series connected between said second and fourth electrodes, (h) an inductor connected between the common connection of said first and second capacitors and the common connection of said first and third electrodes, (i) first rectifier means coupled to said second electrode and having an output, (j) second rectifier means poled opposite to said first rectifier means and having an output, (k) first capacitor storage means coupled to the output of said first rectifier means, (l) second capacitor storage means coupled to the output of said rectifier means, and (m) circuit balancing means coupled between the outputs of said first and second rectifier means and having an output terminal.

References Cited by the Examiner

UNITED STATES PATENTS

| | | | |
|---|---|---|---|
| 2,279,506 | 4/42 | Reid | 329—141 |
| 2,312,070 | 2/43 | Bliss | 329—141 |
| 2,537,163 | 1/51 | Shenk et al. | 329—142 |
| 3,074,021 | 1/63 | Rullman | 329—117 |

ROY LAKE, *Primary Examiner.*